3,474,498
INTERCHANGEABLE INDICIA-FORMING DEVICE
FOR BLOW-MOLDED PLASTIC ARTICLES
Carlos D. Hoppes, Ashland, Ohio, assignor to The National Latex Products Company, Ashland, Ohio, a corporation of Ohio
Filed Apr. 5, 1967, Ser. No. 628,636
Int. Cl. B29c 17/00
U.S. Cl. 18—35      9 Claims

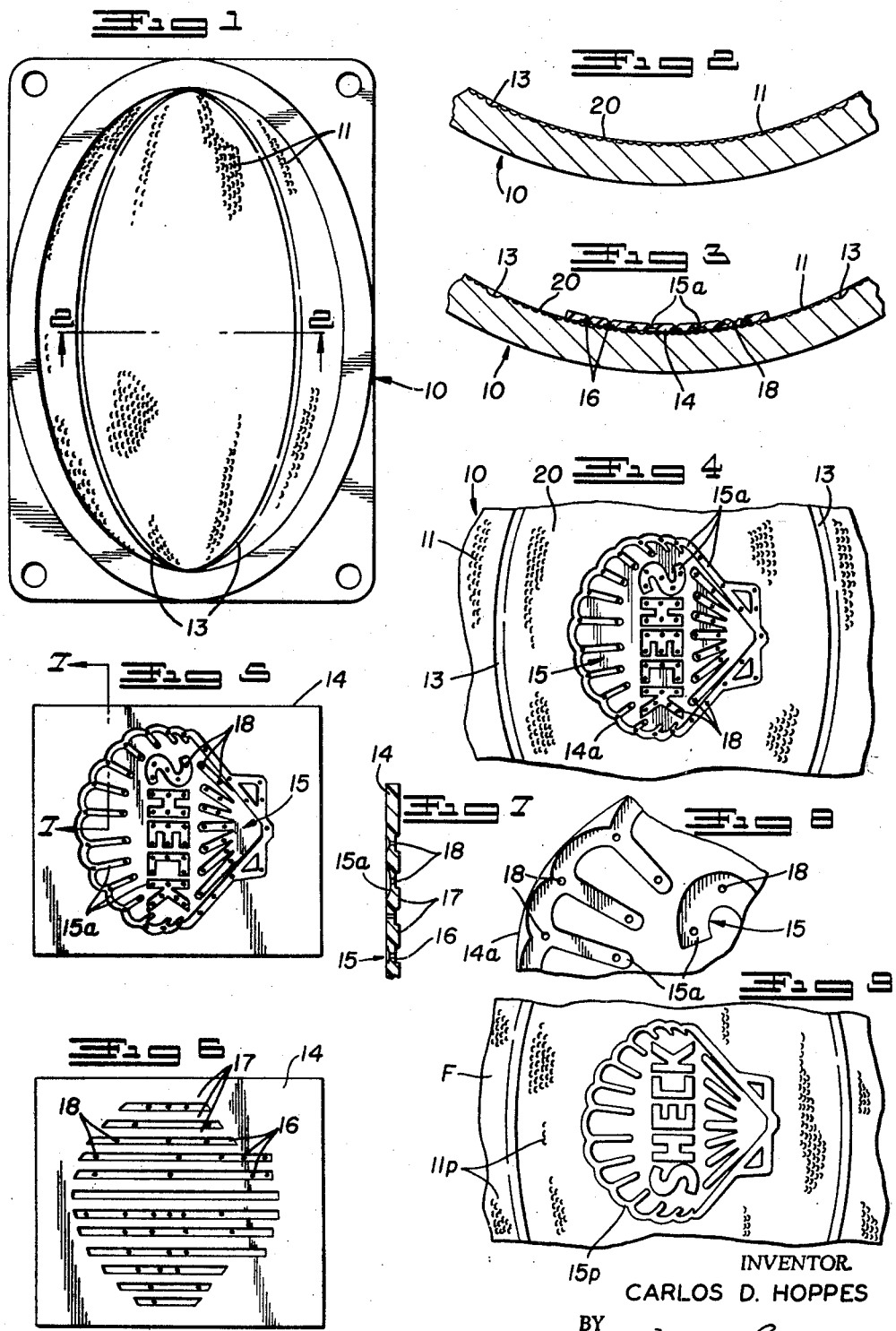

ABSTRACT OF THE DISCLOSURE

Indicia-forming device for combination with article-forming cavity surface of sectional mold for making hollow synthetic resin plastic articles. Device interchangeably attachable to cavity surface includes cooperating means for venting air from interstices in negative three-dimensional, indicia-forming designs in same to assure full, positive, three-dimensional reproduction of indicia on surface of plastic articles formed in mold.

BACKGROUND OF INVENTION

The invention relates to an indicia-forming device for attachment to an article-forming surface portion of a mold, as for imprinting three-dimensional medallion designs, or other indicia, in articles formed in the mold, as by blow-molding methods.

In the past, article-forming molds have had steel inserts affixed in article-forming walls thereof to impress medallion designs, symbols, and various other three-dimensional indicia on the plastic article formed in the mold. These inserts were not readily interchangeable, and were very expensive to produce and install in the molds. Moreover, prior devices of the character described were subject to entrapment of air in design interstices thereof, which frequently produced imperfect impressions on the molded articles.

SUMMARY OF INVENTION

In accordance with the present invention, a thin, flexible pad or plate of rubber-like plastic material is provided with appropriate three-dimensional design configurations on one side thereof, and with air-venting means on the other side of the same which communicates with the interstices of said design configurations without affecting the design-forming accuracy of the latter. The plate is suitably positioned and adhered to an article-forming surface portion of the mold to communicate said interstices with existing air-venting passage means, normally provided in the mold cavity surfaces, through said venting means on the underside of the patch. By venting the air from the article-forming design configurations in this manner, air pockets are eliminated and the designs formed by the plate, accordingly, are sharp and unblemished.

One object of the present invention is to provide an inexpensive indicia-forming device in the mold cavity to produce substantially pawless indicia in plastic articles formed in the mold.

Another object of the invention is to provide an indicia-forming device of the character described, which is quickly and efficiently interchangeable with like indicia-forming devices, to avoid undue expense and delays in production of the blow-molded articles.

These and other objects of the invention will be manifest from the following brief description and the accompanying drawings.

Of the accompanying drawings:

FIGURE 1 is a top plan view looking into the cavity side of one-half of a two-part cavity mold, such as for forming a corresponding half of a plastic toy football having a leather-like or pocked surface design.

FIGURE 2 is an enlarged vertical cross-section taken substantially on the line 2—2 of FIGURE 1.

FIGURE 3 is a view corresponding to FIGURE 2, but showing an indicia-forming device of the invention affixed to the article-forming surface of the mold.

FIGURE 4 is an enlarged fragmentary view of a portion of FIGURE 1, showing the design patch affixed thereto as in FIGURE 3.

FIGURE 5 is a top plan view of a piece of plastic sheeting with the indicia design of FIGURES 3 and 4 imprinted thereon, as by mating dies (not shown).

FIGURE 6 is a bottom view of the plastic piece of FIGURE 5, showing air-venting means provided thereon.

FIGURE 7 is an enlarged fragmentary cross-section taken on the line 7—7 of FIGURE 5.

FIGURE 8 is a similar enlarged fragmentary view of the corresponding portion of FIGURE 5, after the formed plastic piece has been trimmed to desired shape of the interchangeable pad or plate of FIGURES 3 and 4.

FIGURE 9 is a fragmentary plan view of a toy football as formed by the mold portion of FIGURE 4, with the design impression of the pad or plate thereon.

Referring to FIGURE 1, the numeral 10 designates one-half of a two-part, sectional cavity mold, of known type, used in blow-molding hollow plastic articles of various types, such as top baseballs, smooth-surfaced playballs, and including a plastic toy football F as shown partly broken away in FIGURE 9. The mold is indicated as having three-dimensional negative markings 11 to form positive design marks 11P on the article F, simulating the surface markings of a leather football (see FIGURE 9). The mold half 10 may have on the article-forming surfaces thereof arcuate grooves 13, 13 simulating seams of a leather football, which may also serve as venting means, in a manner to be described later.

To provide an interchangeable medallion design in the article, as shown in FIGURE 9, a relatively small rectangular piece 14 of thermoplastic, synthetic resin, sheet material, capable of resisting temperatures encountered in blow-molding operations, may be die-impressed in known manner to imprint a three-dimensional medallion design 15 on a top side thereof, as shown in FIGURE 5, and at the same time imprint on the underside of the same closely spaced parallel grooves 16, 16 or other suitable recess means, and a substantial proportion of smooth surface areas 17, 17 all superposed by the medallion design 15, as shown in FIGURES 5 to 7. Either before or after trimming the sheet containing the medallion design, as illustrated in FIGURE 8, a multiplicity of small air-venting perforations 18, 18 may be suitably provided in the medallion piece 14 to communicate between the interstices 15a of the medallion design 15 and the grooves or recess means 16 in the opposite side of the medallion piece. When the rectangular piece is trimmed to the outline of the medallion design (see FIGURE 8), best venting results may be attained by having grooves or recess means 16 open at the cut edges. Instead of providing perforations 18, it is contemplated that air-venting between opposite sides of the trimmed medallion plate may be accomplished by utilizing a micro-porous synthetic plastic material.

The trimmed medallion plate 14a of FIGURES 4 and 8 may be firmly but removably adhesively attached to the article-forming wall surface 20 of the mold half 10, as shown in FIGURES 3 and 4, by use of any of numerous adhesives suitable for that purpose. Care is taken to apply the adhesive to the attaching surface areas 17 without plugging the air-vent perforations 18.

In use of the mold in known manner as for blow-molding toy plastic footballs F, air tending to become trapped in the interstices or recessed portions 15a of medallion plate 14a is compressed and forced through the vent apertures 18 to the grooves 16 on the underside of said plate, from whence the air travels along the interstices of the mold cavity surface markings 11 and into a groove 13 or other vent passage means normally provided in the mold. By elimination of trapped air in this manner, articles blow-molded in the mold will have full, sharp positive medallions 15p impressed thereon as illustrated in FIGURE 9.

When renewal or replacement of the medallion plate 15 with a plate having the same or a different design indicia is necessary or required, it may be peeled, scraped, or otherwise removed from the mold cavity surface. The new medallion plate 14a may be adhesively applied, as described above, in the same or a different location on said mold cavity surface 20.

The improved medallion plate 14a of the invention is particularly valuable for short run productions of various hollow plastic articles, used as advertising premiums, bearing various medallions, symbols, or designs, and including variations in dealers' names, or names of football teams, high schools, and colleges. For example, a specific trademark name or insignia, such as appears in FIGURE 9, can be integrally formed on one side of the blow-molded articles, while names of different individual dealers of the manufacturer are integrally formed on the other side of said articles. In other words, the improved invention permits the dealer indicia to be changed as often as desired with only brief interruptions in production of the blow-molded articles F.

The medallion plate material may be any natural or synthetic rubber-like material capable of resisting blow-molding temperatures. One such suitable material is polyacrylic rubber known as "Hycar" 4021, a copolymer of an acrylic acid ester and a halogen-containing derivative. This material is readily available in uncured condition, blended with suitable curing agents, such as Trimene Base and sulphur, and sheeted on a calender to suitable thickness. A portion of this uncured or partially cured sheet material is molded between two metal plates or dies (not shown), one of which forms the negative indicia 15 on one side of the sheet 14, and the other forms the venting grooves or interstices 16 on the opposite side of the same (see FIGURES 5 and 6). The molded sheet 14 material is fully cured by heat suitably applied to the plates or dies.

Suitable adhesives for attaching the molded and trimmed medallion plates 14a (see FIGURES 7 and 8), to article-forming cavity portions 20 of the mold, as shown in FIGURES 3 and 4, may include "Pliobond;" a general-purpose adhesive, manufactured by The Goodyear Tire & Rubber Company, and "No. A-862-B Adhesive," a contact cement manufactured by B. F. Goodrich Company.

Modifications of the invention may be resorted to without departing from the spirit thereof or the scope of the appended claims.

What is claimed is:
1. A medallion or like indicia-impressing plate for attachment to an article-forming cavity surface of a mold for molding hollow plastic articles, and having air-venting portions on the cavity surface, said plate comprising: a piece of material having three-dimensional indicia on one side thereof which is the negative of the indicia to be applied to the articles, and which defines recessed portions; the other side of said piece having air-venting recess means therein in air-venting communication with said recessed portions of the negative indicia, whereby upon attachement of said piece to a said mold cavity surface vented air finds escape from said recess means of said piece through said venting portions of the cavity surface.

2. An indicia-impressing plate as in claim 1, said air-venting recess means defining an overall pattern of co-extending surface areas for firm attaching engagement with correspondingly disposed surface portions of the mold cavity surface.

3. An indicia-impressing plate as in claim 2, said piece being of high heat-resistant, resilient plastic material yieldingly conformable to said cavity surface for said attachment thereto.

4. An indicia-impressing plate as in claim 3, said material being a micro-porous synthetic resin.

5. An indicia-impressing plate as in claim 3, said plastic material being perforate for passage of said vented air therethrough.

6. The combination with an article-forming mold for making hollow plastic articles and having air-venting portions on an article-forming cavity surface thereof, of a medallion or like indicia-impressing plate attached to said cavity surface in cooperation with said venting portions thereof, said plate comprising a piece of resilient plastic material having three-dimensional indicia on one side thereof which is the negative of the indicia to be applied to the articles, and which defines recessed portions; the other side of said piece having air-venting recess means therein in air-venting communication with said recessed portions of the negative indicia, whereby the vented air finds escape from said recess means of said piece through said venting portions of the cavity surface.

7. The combination as in claim 6, said piece being of high heat-resistant, resilient plastic material, yieldingly conformed to said cavity surface.

8. The combination as in claim 7, said piece being interchangeably adhered to said cavity surface.

9. The combination as in claim 6, said piece being removably adhesively attached to said cavity surface.

References Cited

UNITED STATES PATENTS

| | | | |
|---|---|---|---|
| 2,656,570 | 10/1953 | Harmon et al. | 18—44 |
| 2,815,305 | 12/1957 | Wassermann | 18—44 X |
| 2,900,664 | 8/1959 | Hampel et al. | |
| 2,924,851 | 2/1960 | Brickhead et al. | 249—141 |
| 3,108,329 | 10/1963 | Chapman. | |
| 3,108,850 | 10/1963 | Brandt. | |
| 3,207,822 | 9/1965 | Makowski. | |
| 3,354,509 | 11/1967 | Ammondson. | |
| 3,380,121 | 4/1968 | Chittenden et al. | 18—44 X |
| 3,408,436 | 10/1968 | Cubitt | 18—44 X |

FOREIGN PATENTS

| | | |
|---|---|---|
| Ad. 1,494 | 1879 | Great Britain. |
| 840,883 | 7/1960 | Great Britain. |

J. HOWARD FLINT, JR., Primary Examiner

U.S. Cl. X.R.

18—5, 44; 249—103, 141; 264—92